United States Patent
Fujioka

(10) Patent No.: US 11,312,010 B2
(45) Date of Patent: Apr. 26, 2022

(54) LINEAR OBJECT HANDLING STRUCTURE OF ROBOT

(71) Applicant: FANUC CORPORATION, Yamanashi (JP)

(72) Inventor: Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 105 days.

(21) Appl. No.: 16/704,231

(22) Filed: Dec. 5, 2019

(65) Prior Publication Data

US 2020/0206911 A1 Jul. 2, 2020

(30) Foreign Application Priority Data

Dec. 27, 2018 (JP) .............................. JP2018-244773

(51) Int. Cl.
*B25J 9/10* (2006.01)
*B25J 9/06* (2006.01)

(52) U.S. Cl.
CPC ................. *B25J 9/104* (2013.01); *B25J 9/06* (2013.01)

(58) Field of Classification Search
CPC ....... B25J 19/0029; B25J 9/104; H02G 11/00; Y10T 74/20311
See application file for complete search history.

(56) References Cited

U.S. PATENT DOCUMENTS

| | | | |
|---|---|---|---|
| 5,212,432 A | 5/1993 | Ohtani et al. | |
| 7,202,442 B2 * | 4/2007 | Nakagiri | ............. B25J 19/0029 219/125.1 |
| 8,544,359 B2 * | 10/2013 | Liu | ...................... B25J 19/0025 74/490.01 |
| 9,233,475 B2 * | 1/2016 | Kume | .................. B25J 19/0025 |
| 2009/0114052 A1 | 5/2009 | Haniya et al. | |
| 2011/0219906 A1 | 9/2011 | Haniya et al. | |
| 2013/0047771 A1 | 2/2013 | Liu et al. | |

(Continued)

FOREIGN PATENT DOCUMENTS

| | | |
|---|---|---|
| EP | 1 930 129 A1 | 6/2008 |
| EP | 2 113 343 A2 | 11/2009 |

(Continued)

OTHER PUBLICATIONS

Japanese Office Action dated Mar. 23, 2021, in connection with corresponding JP Application No. 2018-244773 (7 pp., including machine-generated English translation).

*Primary Examiner* — Bobby Rushing, Jr.
(74) *Attorney, Agent, or Firm* — Maier & Maier, PLLC

(57) ABSTRACT

A linear object handling structure of a robot that includes a base to be fixed to an installed surface, and a rotary barrel supported to be rotatable around a vertical rotary axis with respect to the base, and is provided with, in a region including the rotary axis, a through hole vertically penetrating through a top board of the base, and a hollow portion having a cylindrical inner surface extending inside the rotary barrel from the through hole along the rotary axis. A mechanism unit cable of the robot passes from an inside of the base to an upper part of the rotary barrel through the through hole and the hollow portion, and is fixed in the inside of the base and at the upper part of the rotary barrel while the mechanism unit cable is bent inside the hollow portion and is pressed against the inner surface.

5 Claims, 5 Drawing Sheets

(56) References Cited

U.S. PATENT DOCUMENTS

| | | | |
|---|---|---|---|
| 2016/0089797 A1* | 3/2016 | Kawase | ............... B25J 19/005 74/490.02 |
| 2017/0259436 A1 | 9/2017 | Nakayama et al. | |
| 2017/0282382 A1* | 10/2017 | Inoue | ................ B25J 19/0029 |
| 2017/0291313 A1 | 10/2017 | Inoue et al. | |

FOREIGN PATENT DOCUMENTS

| | | | | |
|---|---|---|---|---|
| JP | H03136788 A | 6/1991 | | |
| JP | H07124886 A | 5/1995 | | |
| JP | 2002307369 A | 10/2002 | | |
| JP | 3483862 B | 1/2004 | | |
| JP | 2012-056082 A | 3/2012 | | |
| JP | 2013-099826 A | 5/2013 | | |
| JP | 2017-159397 A | 9/2017 | | |
| JP | 2017-185597 A | 10/2017 | | |
| WO | WO-2010073568 A1 * | 7/2010 | ............. | B25J 9/044 |

* cited by examiner

US 11,312,010 B2

LINEAR OBJECT HANDLING STRUCTURE OF ROBOT

CROSS-REFERENCE TO RELATED APPLICATIONS

This application claims the benefit of Japanese Patent Application No. 2018-244773, the content of which is incorporated herein by reference.

FIELD

The present invention relates to a linear object handling structure of a robot.

BACKGROUND

In a vertical articulated robot, a linear object handling structure in which a cavity portion continuous from a base to an upper part of a rotary barrel is provided at a position including a rotary axis of the rotary barrel, and a cable of a robot mechanism unit is wired through the cavity portion, is well-known (for example, see Japanese Patent No. 3483862).

Even when the rotary barrel is rotated, large bending stress does not act on the cable that passes through a position close to the rotary axis of the rotary barrel inside the cavity portion along the rotary axis, and the cable is durably usable.

SUMMARY

According to an aspect of the present invention, a linear object handling structure of a robot includes a base to be fixed to an installed surface, and a rotary barrel supported to be rotatable around a vertical rotary axis with respect to the base, and is provided with a through hole and a hollow portion in a region including the rotary axis. The through hole vertically penetrates through a top board of the base, and the hollow portion has a cylindrical inner surface extending inside the rotary barrel from the through hole along the rotary axis. A mechanism unit cable of the robot passes from an inside of the base to an upper part of the rotary barrel through the through hole and the hollow portion, and is fixed in the inside of the base and at the upper part of the rotary barrel while the mechanism unit cable is bent inside the hollow portion and is pressed against the inner surface of the hollow portion.

DETAILED DESCRIPTION

A linear object handling structure 1 of a robot 10 according to an embodiment of the present invention is described below with reference to drawings.

Figure 1:
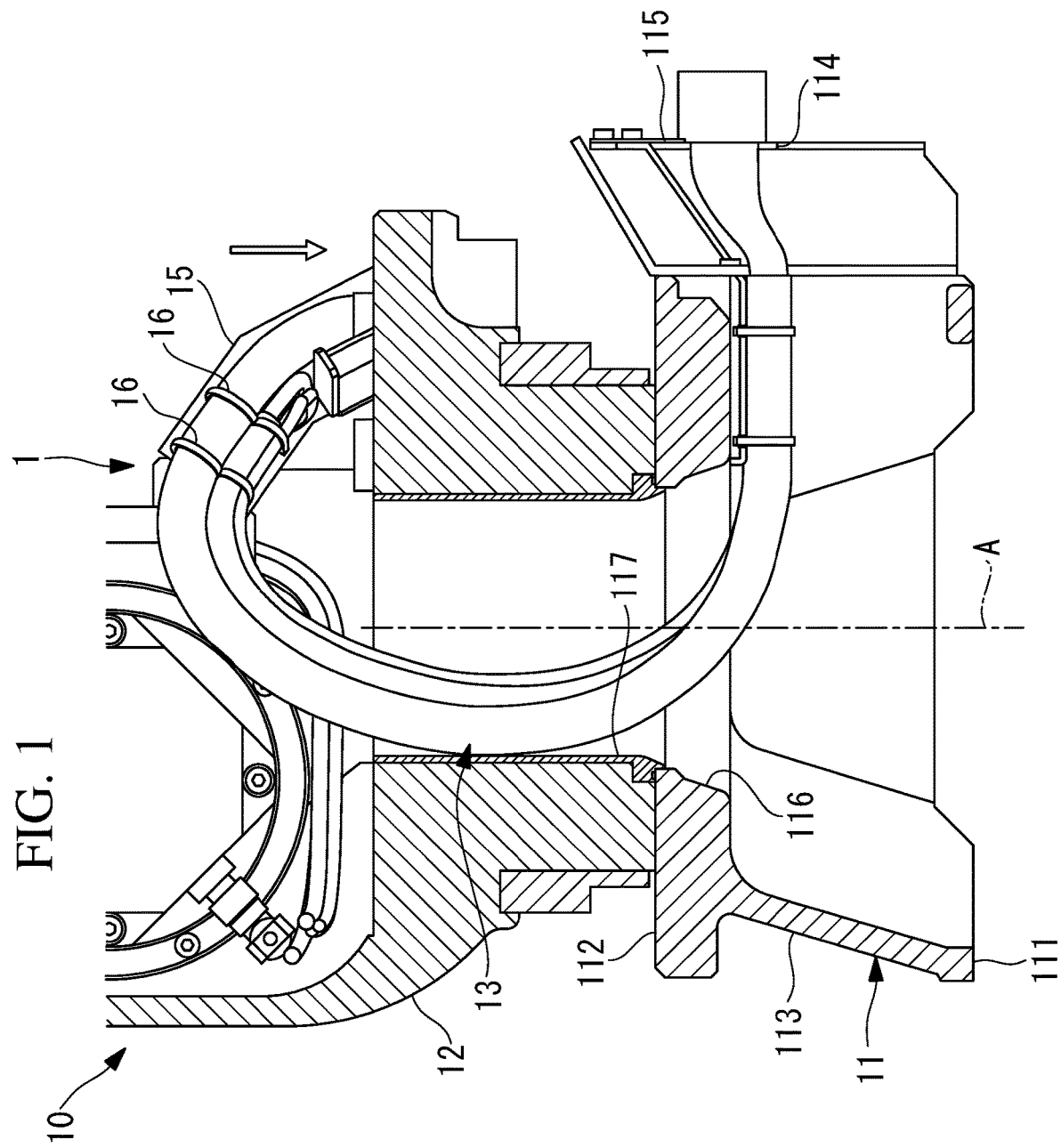
FIG. 1 is a partial vertical cross-sectional view illustrating a linear object handling structure of a robot according to an embodiment of the present invention.

The robot 10 to which the linear object handling structure 1 according to the present embodiment is applied is, for example, a vertical articulated robot as illustrated in FIG. 1. The type of the robot 10 is not limited.

The robot 10 includes a base 11, a rotary barrel 12, a first arm (not illustrated), a second arm (not illustrated), and a wrist unit (not illustrated). The base 11 is placed on a floor (installed surface). The rotary barrel 12 is supported so as to be rotatable around a vertical first axis (rotary axis) A with respect to the base 11. The first arm is supported so as to be rotatable around a horizontal second axis with respect to the rotary barrel 12. The second arm includes a long shaft that is supported so as to be rotatable around a horizontal third axis with respect to the first arm. The wrist unit is supported at a front end of the second arm. Respective connectors at a front end of a mechanism unit cable 13 wired from the base 11 through the rotary barrel 12 are connected to a motor (not illustrated) that rotationally drives the rotary barrel 12 around the first axis A, a motor that rotates the first arm around the second axis, a motor (not illustrated) that rotates the second arm around the third axis, and a motor (not illustrated) that drives the wrist unit.

The base 11 has a box shape that includes a bottom surface 111 to be fixed to the floor, a top board 112 disposed in parallel to and above the bottom surface 111 with a distance, and side walls 113 disposed between the top board 112 and the bottom surface 111. An opening 114 through which the mechanism unit cable 13 and a retrofitted linear object (see FIG. 4) 14 pass is provided in at least one of the side walls 113. A wiring board 115 to which a connector at a base end of the mechanism unit cable 13 is fixed is fixed to the opening 114.

The wiring board 115 that fixes the connector of the mechanism unit cable 13 partially closes an upper side of the opening 114, whereas the wiring board 115 opens a lower side of the opening 114 without closing the opening 114 in order to allow the retrofitted linear object 14 to pass through the opening 114.

A circular through hole 116 with the first axis A as a center is provided at a center of the top board 112 of the base 11 so as to vertically penetrate through the top board 112. A cylindrical member 117 continuing with the through hole 116 is fixed to an upper surface of the top board 112 of the base 11. The cylindrical member 117 is disposed at a position vertically extending inside an internal space of the rotary barrel 12 along the first axis A. An internal space of the cylindrical member 117 configures a hollow portion through which the mechanism unit cable 13 and the retrofitted linear object 14 vertically pass.

The linear object handling structure 1 according to the present embodiment is a handling structure for the mechanism unit cable 13 from the base 11 to the rotary barrel 12. As illustrated in FIG. 1, the mechanism unit cable 13 is vertically wired through the through hole 116 of the base 11 and the internal space of the cylindrical member 117, and is fixed to an attachment plate 15 fixed in an internal space of the base 11 and to an attachment plate 15 fixed to an upper part of the rotary barrel 12 by binding bands 16.

In the internal space of the base 11, the mechanism unit cable 13 is disposed at a position substantially in parallel to a lower surface of the top board 112 of the base 11 from the opening to which the wiring board 115 is fixed, toward the through hole 116, and is fixed to the attachment plate 15.

At the upper part of the rotary barrel 12, the mechanism unit cable 13 drawn out from an upper end of the cylindrical member 117 is fixed to the attachment plate 15 that is fixed to the rotary barrel 12, in a form of descending toward a front end side (toward direction illustrated by arrow in figure).

The mechanism unit cable 13 vertically passes through the through hole 116 and the internal space of the cylindrical member 117 while being bent in one direction and pressed against an inner surface of the cylindrical member 117 between the two attachment plates 15.

Operation of the linear object handling structure 1 including such a configuration, of the robot 10 according to the present embodiment is described below.

Figure 2:
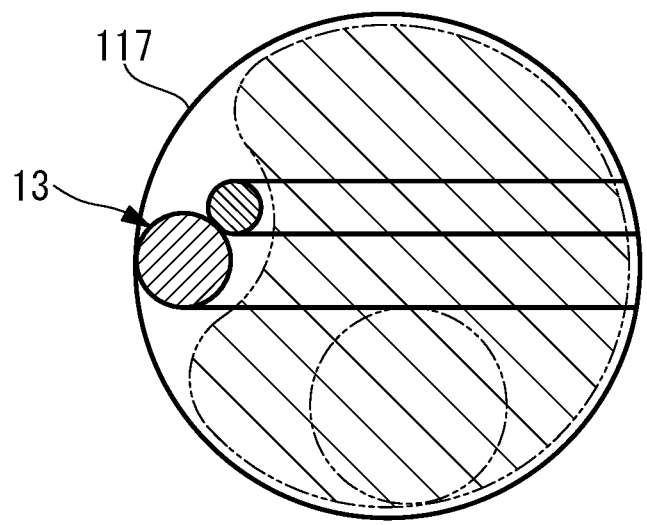
FIG. 2 is a cross-sectional view illustrating an example of a mechanism unit cable disposed in an internal space of a cylindrical member of the linear object handling structure in FIG. 1.

In the linear object handling structure 1 of the robot 10 according to the present embodiment, a part of the mechanism unit cable 13 passing through the through hole 116 of the base 11 and the internal space of the cylindrical member 117 is bent and pressed against the inner surface of the cylindrical member 117 as illustrated in FIG. 2. As a result, as compared with a case where the mechanism unit cable 13 is straightly wired at a center of the cylindrical member 117 as illustrated in FIG. 3, a wide gap (hatched part in figure) in the through hole 116 and the internal space of the cylindrical member 117 can be secured.

Figure 3:
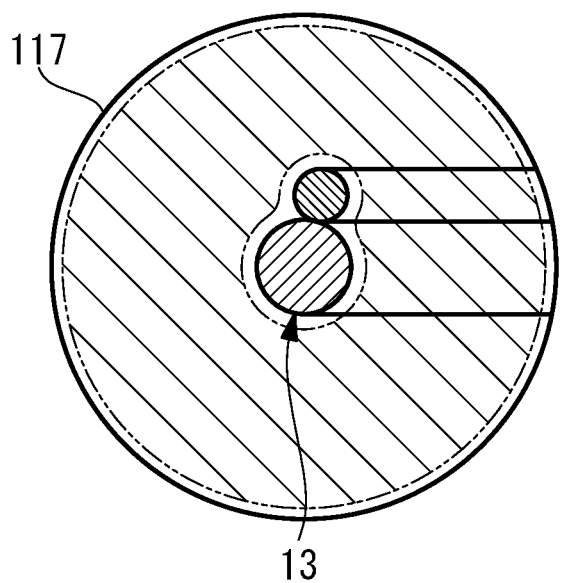
FIG. 3 is a cross-sectional view illustrating a state where the mechanism unit cable is disposed at a center of the cylindrical member of the robot in FIG. 1.

In other words, as illustrated in FIG. 3, in the case where the mechanism unit cable 13 is disposed at the center of the through hole 116 and at the center of the internal space of the cylindrical member 117, the gap is substantially uniformly dispersed over an entire circumference, and a unified large gap cannot be secured. In contrast, disposing the mechanism unit cable 13 on one side in a radial direction of the internal space as illustrated in FIG. 2 makes it possible to secure a large gap.

Figure 4:
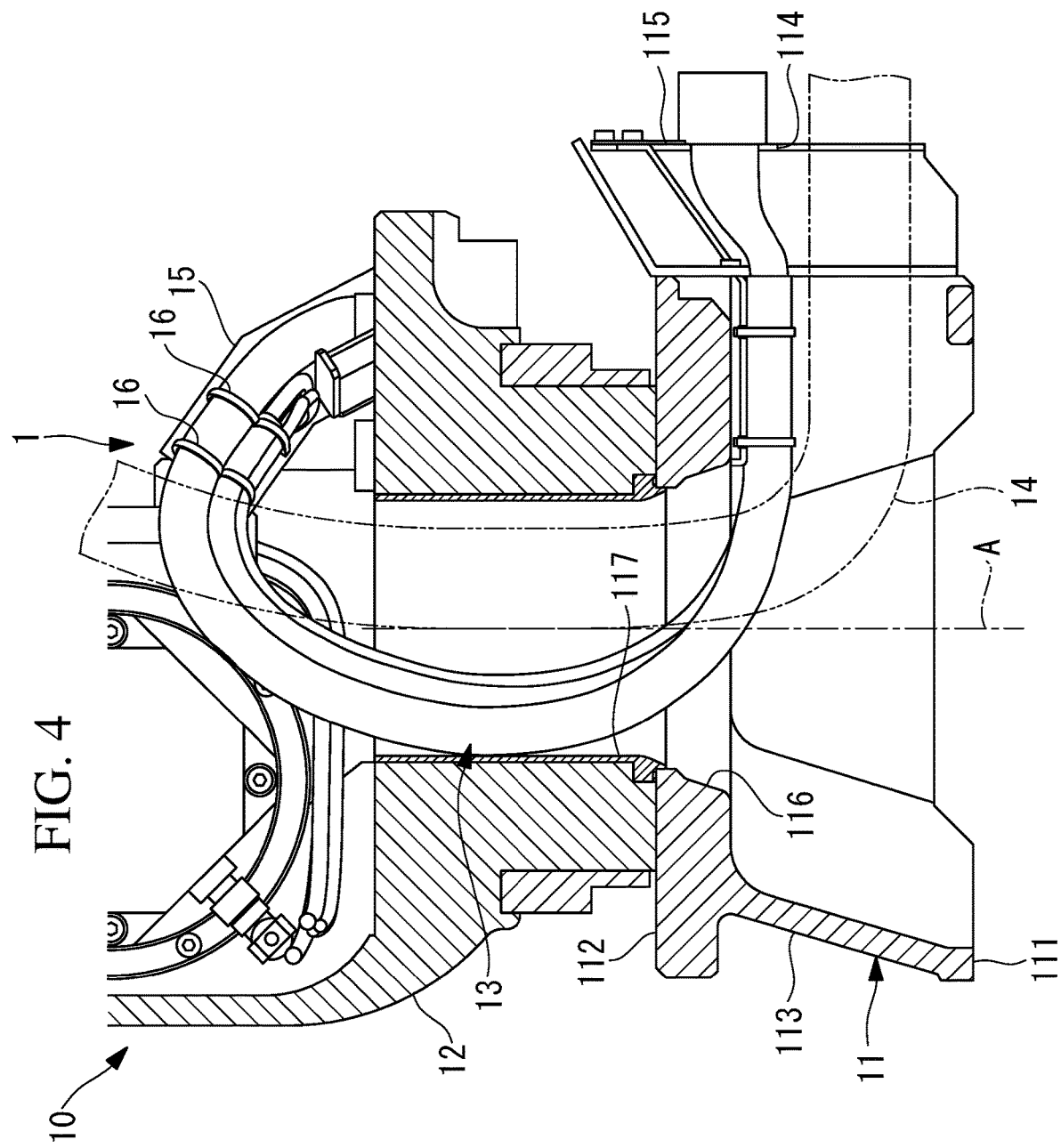
FIG. 4 is a partial vertical cross-sectional view illustrating a state where a retrofitted linear object is disposed in the robot in FIG. 1.

Accordingly, in a case where the user wires the retrofitted linear object 14, the user can wire the retrofitted linear object 14 through a gap largely secured as illustrated in FIG. 2 and FIG. 4. In this case, it is possible to avoid interference between the retrofitted linear object 14 and the mechanism unit cable 13. Therefore, it is possible to prevent the wiring route of the mechanism unit cable 13 from being changed when the user wires the retrofitted linear object 14, and to prevent the mechanism unit cable 13 from being damaged by friction with the wired retrofitted linear object 14.

Figure 5:
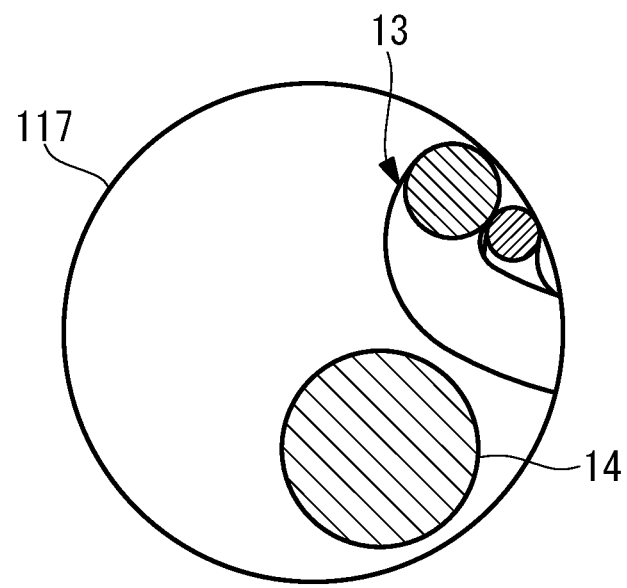
FIG. 5 is a cross-sectional view illustrating a state where a rotary barrel is rotated in a clockwise direction while the mechanism unit cable is disposed by the linear object handling structure in FIG. 2.
Figure 6:
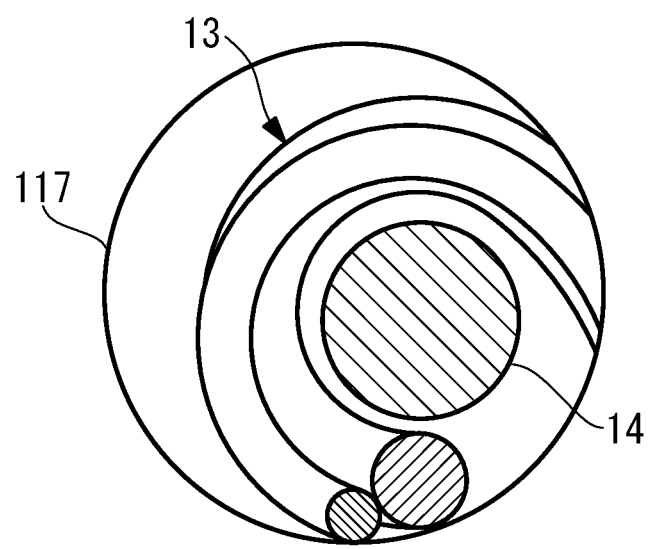
FIG. 6 is a cross-sectional view illustrating a state where the rotary barrel is rotated in a counterclockwise direction while the mechanism unit cable is disposed by the linear object handling structure in FIG. 2.

In the linear object handling structure 1 according to the present embodiment, the part of the mechanism unit cable 13 disposed in the internal space of the cylindrical member 117 is deflected to one side in the radial direction of the internal space. Therefore, when the rotary barrel 12 is rotated around the first axis A with respect to the base 11, a circumferential position of the mechanism unit cable 13 is also moved as illustrated in FIG. 5 and FIG. 6. Also in this case, the mechanism unit cable 13 is maintained in the state of being pressed against the inner surface of the cylindrical member 117. This makes it possible to continuously maintain the large gap allowing for passage of the retrofitted linear object 14, inside the cylindrical member 117.

Further, in the present embodiment, as illustrated in FIG. 1, the mechanism unit cable 13 is substantially horizontally fixed in the internal space of the base 11. Therefore, the part of the mechanism unit cable 13 disposed in the internal space of the cylindrical member 117 can be easily set to the bent state only by applying bending force to a part of the mechanism unit cable 13 drawn out to the upper part of the rotary barrel 12 through the internal space of the cylindrical member 117.

Furthermore, in the present embodiment, as illustrated in FIG. 1, the mechanism unit cable 13 is fixed in the form of descending toward the front end side at the upper part of the rotary barrel 12. Therefore, tension is applied to the mechanism unit cable 13 to raise the part of the mechanism unit cable 13 disposed in the internal space of the cylindrical member 117 upward, which allows for wiring without slack.

Further, in the present embodiment, since the mechanism unit cable 13 is disposed at the position along the lower surface of the top board 112 in the internal space of the base 11, the user can dispose the retrofitted linear object 14 introduced into the base 11, below the mechanism unit cable 13. Even in the case where a linear object having a large weight is introduced as the retrofitted linear object 14, passage of the retrofitted linear object 14 through a wiring route below the mechanism unit cable 13 prevents the weight of the retrofitted linear object 14 from being applied to the mechanism unit cable 13. This advantageously maintains the mechanism unit cable 13 in a sound state.

Note that, in the present embodiment, the mechanism unit cable 13 drawn out to the upper part of the rotary barrel 12 from the internal space of the cylindrical member 117 may be fixed to the attachment plate 15 while the mechanism unit cable 13 is twisted in one direction, for example, in a clockwise direction. When the mechanism unit cable 13 is twisted in one direction, it is possible to deflect the part of the mechanism unit cable 13 disposed in the bent state in the through hole 116 and the internal space of the cylindrical member 117, in one direction intersecting with the bending direction, as illustrated in FIG. 7.

Figure 7:
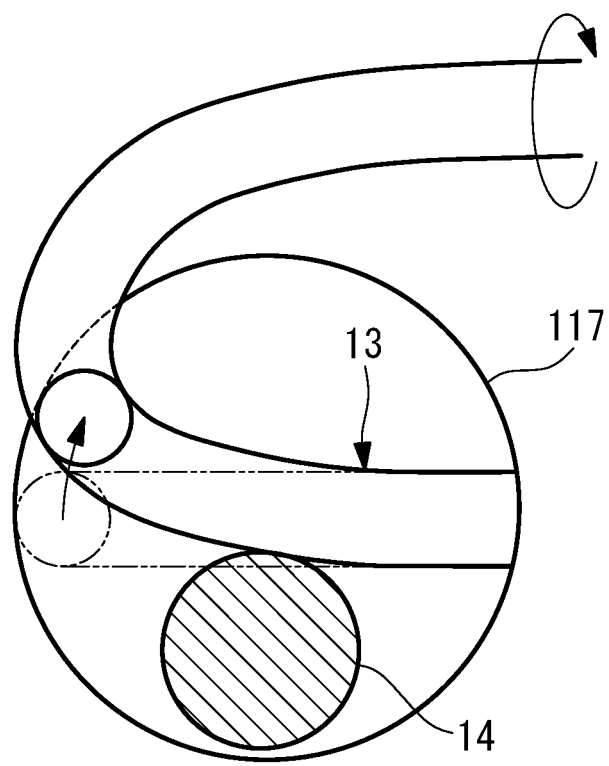
FIG. 7 is a cross-sectional view illustrating a modification of the linear object handling structure in FIG. 1 in a state where the mechanism unit cable is twisted.

As a result, the large gap vertically passing through the through hole 116 and the internal space of the cylindrical member 117 can be formed as illustrated in FIG. 7, which advantageously facilitates the wiring of the retrofitted linear object 14.

Figure 8:
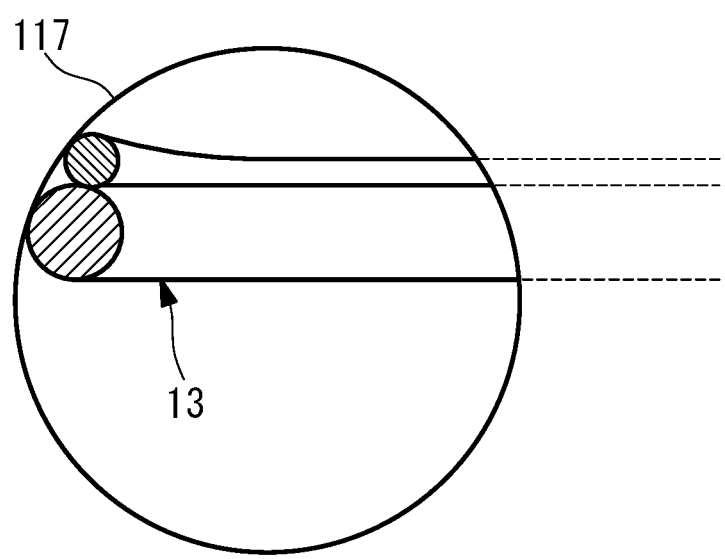
FIG. 8 is a cross-sectional view illustrating another modification of the linear object handling structure in FIG. 1 in a state where the mechanism unit cable in a base is offset from a center axis of a through hole.

Further, as illustrated in FIG. 8, the mechanism unit cable 13 disposed in the internal space of the base 11 may be fixed to a position deflected in one direction with respect to the through hole 116. This also makes it possible to deflect the part of the mechanism unit cable 13 disposed in the through hole 116 and the internal space of the cylindrical member 117 in one direction.

From the above-described embodiment, the following invention is derived.

According to an aspect of the present invention, a linear object handling structure of a robot includes a base to be fixed to an installed surface, and a rotary barrel supported to be rotatable around a vertical rotary axis with respect to the base, and is provided with a through hole and a hollow portion in a region including the rotary axis. The through hole vertically penetrates through a top board of the base, and the hollow portion has a cylindrical inner surface extending inside the rotary barrel from the through hole along the rotary axis. A mechanism unit cable of the robot passes from an inside of the base to an upper part of the rotary barrel through the through hole and the hollow portion, and is fixed in the inside of the base and at the upper part of the rotary barrel while the mechanism unit cable is bent inside the hollow portion and is pressed against the inner surface of the hollow portion.

According to the present aspect, the mechanism unit cable of the robot enters the base and is drawn out to the upper part of the rotary barrel through the through hole of the top board of the base and the hollow portion rising upward from the through hole, and is wired to the rotary barrel and a motor of each axis disposed above the rotary barrel. In this state, the part of the mechanism unit cable of the robot disposed inside the hollow portion is bent in one direction and is pressed against the inner surface of the hollow portion, and both sides of the bent part are fixed in the inside of the base and at the upper part of the rotary barrel.

As a result, the mechanism unit cable passes a position close to the inner surface inside the hollow portion, which makes it possible to secure a large gap inside the hollow portion. In other words, in a case where a user wires an additional linear object, the user can easily wire the additional linear object through a wiring route with little interference with the mechanism unit cable without changing the wiring route of the mechanism unit cable.

In the above-described aspect, the mechanism unit cable may be substantially horizontally fixed inside the base.

With this configuration, it is possible to easily bend the part of the mechanism unit cable vertically passing through the hollow portion only by applying bending force to the mechanism unit cable drawn out to the upper part of the rotary barrel, and to easily achieve the wiring route in which the mechanism unit cable is pressed against the inner surface of the hollow portion.

Further, in the above-described aspect, the mechanism unit cable may be fixed to a position along a lower surface of the top board inside the base.

With this configuration, it is possible to prevent the linear object retrofitted by the user from being placed on the mechanism unit cable, and to prevent damage of the mechanism unit cable.

Further, in the above-described aspect, the mechanism unit cable may be fixed in a form of descending from a base end side toward a front end side at the upper part of the rotary barrel.

With this configuration, it is possible to wire the mechanism unit cable in a state where the bent part of the mechanism unit cable passing through the hollow portion is raised upward, and to accordingly prevent slack of the mechanism unit cable, thereby improving durability.

Further, in the above-described configuration, the mechanism unit cable may be fixed while being twisted in one direction inside the hollow portion.

With this configuration, the mechanism unit cable bent so as to be pressed against the inner surface of the hollow portion is deflected in a direction intersecting with the bending direction by twisting force inside the hollow portion, which makes it possible to secure a larger gap inside the hollow portion.

The invention claimed is:

1. A linear object handling structure of a robot, including a base to be fixed to an installed surface, and a rotary barrel supported to be rotatable around a vertical rotary axis with respect to the base, and a through hole and a hollow portion in a region including the rotary axis, the through hole vertically penetrating through a top board of the base, and the hollow portion having a cylindrical inner surface extending inside the rotary barrel from the through hole along the rotary axis, the linear object handling structure comprising:
   a lower attachment plate that is fixed to an inside of the base and an upper attachment plate that is fixed to an upper part of the rotary barrel, wherein the attachment plates fix a mechanism unit cable of the robot so that the mechanism unit cable extending from the inside of the base to the upper part of the rotary barrel through the through hole and the hollow portion is maintained in a state of being bent inside the hollow portion to be pressed against an inner surface of the hollow portion.

2. The linear object handling structure of the robot according to claim 1, wherein the lower attachment plate substantially horizontally fixes the mechanism unit cable inside the base.

3. The linear object handling structure of the robot according to claim 1, wherein the lower attachment plate fixes the mechanism unit cable at a position along a lower surface of the top board inside the base.

4. The linear object handling structure of the robot according to claim 1, wherein the mechanism unit cable is maintained in the state of being bent inside the hollow portion to be pressed against the inner surface of the hollow portion by being twisted in one direction inside the hollow portion.

5. The linear object handling structure of the robot according to claim 1, wherein the upper attachment plate fixes the mechanism unit cable in a form that the mechanism unit cable descends from an upper end of the cylindrical member toward a front end side at the upper part of the rotary barrel.

* * * * *